United States Patent [19]
Denno et al.

[11] Patent Number: 6,128,391
[45] Date of Patent: Oct. 3, 2000

[54] METHOD AND APPARATUS FOR ASYMETRIC KEY MANAGEMENT IN A CRYPTOGRAPHIC SYSTEM

[75] Inventors: Rodney Grant Denno, Pleasanton; Lance James Johnson, San Mateo, both of Calif.

[73] Assignee: Visa International Service Association, Foster City, Calif.

[21] Appl. No.: 08/934,838

[22] Filed: Sep. 22, 1997

[51] Int. Cl.$^7$ ........................................ H04K 1/00
[52] U.S. Cl. .................. 380/283; 380/232; 380/273; 380/277; 380/281; 705/66; 705/71; 713/169; 713/171
[58] Field of Search ................... 380/200, 231, 380/232, 255, 273, 277, 278, 281, 282, 283, 284, 285, 44; 705/65, 66, 67, 71, 73; 713/169, 171

[56] References Cited

U.S. PATENT DOCUMENTS

| | | | |
|---|---|---|---|
| 4,471,216 | 9/1984 | Herve | 235/380 |
| 4,605,820 | 8/1986 | Campbell . | |
| 4,811,393 | 3/1989 | Hazard | 380/21 |
| 4,961,142 | 10/1990 | Elliott et al. | 364/408 |
| 5,036,461 | 7/1991 | Elliott et al. | 364/408 |

(List continued on next page.)

FOREIGN PATENT DOCUMENTS

| | | |
|---|---|---|
| 0 253 722 | 1/1988 | European Pat. Off. . |
| 0 440 800 | 8/1991 | European Pat. Off. . |
| 0 548 967 | 6/1993 | European Pat. Off. . |
| 0 552 392 | 7/1993 | European Pat. Off. . |
| 2600190 | 12/1987 | France . |

(List continued on next page.)

OTHER PUBLICATIONS

Schneier B, "Applied Cryptography" Protocols, Algorithms and Source Code in C, Second Edition; Chapter 12, Data Encryption Standard (DES); John Wiley & Sons, New York, 1996.

"Financial Services Retail Key Management," *American National Standards Institute*, ANSI/ABA X9.24–19, pp. 36–50, Apr. 6, 1992.

Hellman, Martin E., "The Mathematics of Public–Key Cryptography," *Scientific American*, pp. 146–157, Aug. 1979.

(List continued on next page.)

*Primary Examiner*—Tod R. Swann
*Assistant Examiner*—Paul E. Callahan
*Attorney, Agent, or Firm*—Beyer,Weaver & Thomas, LLP

[57] ABSTRACT

A method and apparatus for asymmetrical key management in a cryptographic system is provided. Embodiments of the invention implement varying levels of diversification to manage the encryption keys. In one embodiment, a unique key per device approach is used that minimizes the risks due to unauthorized key access. In yet another embodiment, a unique key per device per transaction is used. The keys generated in embodiments of the invention can be used to authenticate one device with another. An authenticating device generates a current key that is initially unknown to an unauthenticated device. The authenticating device sends information to an unauthenticated device to assist it in determining the value of the current key. The unauthenticated device uses the determined value of the current key to derive the authenticating device's authentication value. Each device generates a authentication value that must be correctly determined by an unauthenticated device for successful authentication. Authentication is performed between two devices such that each device is authenticated with the other device. Computing devices of a system can be grouped. In one embodiment devices are grouped such that one group includes devices that have a master key and another group includes devices that have a key that is derived from the master key. Another embodiment includes groups whose devices have the group's master key and a key derived from each of the master keys of the other group(s). In this embodiment, a dual authentication process can be used to authenticate two devices from different groups.

51 Claims, 12 Drawing Sheets

U.S. PATENT DOCUMENTS

| | | | |
|---|---|---|---|
| 5,175,416 | 12/1992 | Mansvelt et al. | 235/379 |
| 5,446,796 | 8/1995 | Ishiguro | 380/24 |
| 5,559,887 | 9/1996 | Davis et al. | 380/24 |
| 5,577,121 | 11/1996 | Davis et al. | 380/24 |
| 5,602,917 | 2/1997 | Mueller | 380/21 |
| 5,729,609 | 3/1998 | Moulart | 380/21 |
| 5,745,576 | 4/1998 | Abraham | 380/21 |

FOREIGN PATENT DOCUMENTS

| | | | |
|---|---|---|---|
| 2681165 | 3/1993 | France . | |
| 2 270 446 B | 3/1994 | United Kingdom | H04L 9/32 |
| 95-19672 | 7/1995 | WIPO | H04L 9/08 |
| 96-26586 | 8/1996 | WIPO | H04L 9/32 |

OTHER PUBLICATIONS

Fiestel, Horst, "Crytography and Computer Privacy," *Scientific American*, vol. 238, No. 5, pp. 15–23, May 1973.

Naccache, David, et al., "Cryptograhic Smart Cards," *IEEE Micro 1996*, vol. 16, No. 3, pp. 14–24, Jun. 1996.

METHOD AND APPARATUS FOR ASYMETRIC KEY MANAGEMENT IN A CRYPTOGRAPHIC SYSTEM

BACKGROUND OF THE INVENTION

1. Field of the Invention

This invention relates to the field of symmetric key cryptographic systems.

2. Background Art

Information can be transmitted between, for example, computing devices that is considered to be sensitive information. That is, information that either the sender or the receiver wishes to be readable, and/or verifiable as unchanged, by the receiver only. One type of sensitive information is financial information such as a bank account balance, an account's personal identification number (PIN), or medical records. It would be beneficial to be able to send sensitive information to the receiver in such a way that it cannot be read by anyone other than the receiver and/or that the receiver can be assured it has not been altered in transit.

One technique that is used to safeguard information such that it is readable only by the receiver is referred to as encryption. The information is scrambled, or encrypted, by the sender. When the scrambled information is received by the receiver, it is unscrambled, or decrypted.

Information is typically encrypted or decrypted using keys. To encrypt the information, an encryption key is applied to the information to scramble it such that its content is no longer apparent to a reader. A decryption key is applied to the encrypted information to unscramble it. A key can be a random number, for example.

A system that can be used to encrypt or decrypt information is referred to as a cryptographic system. Before it is scrambled, or encrypted, information such as a payment transaction is referred to as "plaintext". A cryptographic system converts the "plaintext" message into an encrypted format, known as "ciphertext." The encryption is accomplished by manipulating or transforming the message using a "cipher key" or keys. The receiver "decrypts" the message, that is, converts it from ciphertext to plaintext, by reversing the manipulation or transformation process using the cipher key or keys. Such an encrypted transmission is secure, if only the sender and receiver have knowledge of the cipher key.

A cryptographic system uses an encryption/decryption scheme that transforms plaintext into ciphertext using a key. Such a scheme applies the key to the information to transform the information. One example of an encryption/decryption scheme is the Data Encryption Algorithm (DEA) defined in ANSI X3.92 and also referred to as the Data Encryption Standard (DES).

A detailed explanation of the DEA is provided in Applied Cryptography: Protocols, Algorithms, and Source Code in C, Schneier, B., John Wiley & Sons, Inc. (1996) and is incorporated herein by reference.

If a cipher key is made public, the information that is encrypted using the cipher key becomes unsecure. That is, anyone who has knowledge of the cipher key can use it to decrypt information encrypted using the cipher key. It is therefore important to develop a technique for managing a cipher key in a cryptographic system so that it is protected from unauthorized access.

U.S. Pat. No. 5,175,416, issued to Mansvelt et al. on Dec. 29, 1992 is an example of symmetric key management system. That is, a system in which the same key is used by both the sender and receiver. Mansvelt et al. describes an authentication mechanism in a funds transfer system that involves a payer card and a payee card. The payer card generates a message and encrypts the message using the common encryption key. The encrypted message is transmitted to the payee card. The payee card decrypts the message using the common encryption key.

Thus, both the payer and the payee have knowledge of the common encryption key. This is disadvantageous because it increases the potential for a breach in security. The more cards in circulation that contain the common encryption key, the greater the access is to the common encryption key. A single card can be used by one wishing to compromise the system to determine the encryption key that is used throughout the system. Once the key is determined, it can then be used throughout with any card (e.g., either a payer or a payee card) to modify a past transaction or to effect a new transaction. The improperly obtained key can be used to effect both previous and future card transactions.

SUMMARY OF THE INVENTION

In one or more embodiments of the invention, a method and apparatus for managing keys asymmetrically in a cryptographic system is provided. Embodiments of the invention use key diversification to limit the risk of unauthorized use of a key in a cryptographic system.

In an undiversified cryptographic system (e.g., a system that uses static symmetric key management), the same key is stored in all computing devices which is used for each transaction. An unauthorized person can compromise the entire system by determining the value of the key. For example, by knowing the cipher key, an unauthorized person can use the key to modify information generated using the key. An unauthorized person can effect future transactions of the system using the key. Further, since the same key is used for past transactions, an unauthorized person can use the key to make undetectable modifications to previous transactions.

In one embodiment of the invention a level of diversification is used whereby computing devices in the system are members of one of two groups. A "master key" group of devices have a master (or derivation) key that is used to derive a unique key. A "derived key" group of devices have a unique key that is derived from the master key. One type of transaction occurs when two devices interact where one device uses the master key, but the other device uses the unique diversified key. A breach of security of a computing device's transactions, for those devices residing in the "derived key" group, is limited by this level of diversification to that computing device. If a computing device from the "derived key" group that uses the same unique key for each transaction is compromised, the unique key can be used to make undetectable modifications to both past and future transactions for that device.

In yet another embodiment of the invention, for the "derived key" group of devices, a unique key that is derived from a master key is used per computing device per transaction. The unique key is destroyed once it has been used in a transaction. Thus, successful breach of a computing device's unique key can only affect a single transaction. Further, previous transactions cannot be modified and are therefore not at risk. Unauthorized use of a computing device's unique key due to tampering is limited to a single computing device and a single transaction. Thus, the invention limits the breach of security and the potential for unauthorized access.

In yet another embodiment of the invention, all devices are grouped into one of two groups, A and B, and each group has a unique master key unrelated to the master key of the other group. In each group, a unique key that is derived from the master key of the other group, is used per computing device per transaction. The unique key is destroyed once it has been used in a transaction. A successful transaction requires that both devices authenticate themselves using both their unique diversified key and their master key. Thus, a successful breach of any computing device's unique and master keys can only affect a single transaction. Further, previous transactions cannot be modified and are therefore not at risk. Unauthorized use of a computing device's unique and master keys due to tampering can thereby be limited to a single computing device and a single transaction. Thus, the invention limits the breach of security and the potential for unauthorized access. Using the invention, tampering of any single device cannot compromise the entire system.

This embodiment can be extended such that devices are grouped into more than two groups (e.g., "n" groups where n is 1, 2, 3, 4, 5, . . . ) Each group has a unique master key unrelated to the master key of any other group. In each group, each device contains the master key for its own group and multiple (n−1) derived unique keys one each derived from each other group's master key.

A successful transaction requires that two devices authenticate themselves using both their master key and the derived unique key relating to the master key resident in the other card.

A successful breach of any computing device's unique and master keys can only affect a single device or transaction. Compromise of two devices only compromises the two groups' devices, not the entire population of devices. A complete system compromise would require the breach of at least one device from each group. Therefore, in a population of devices with "n" groups, a system compromise requires the breach of at least "n" devices.

The key management capabilities in embodiments of the invention can be used in a financial transaction authorization (e.g., credit card transaction) system. Specifically, embodiments of the invention can be used to manage the keys used to encrypt the information transmitted between a merchant card and a consumer card (e.g., consumer credit card) during the transaction authorization process. The merchant card and consumer card have an ability to retain or store the cipher key (i.e., key). A smart card technology can also be used such that each card has memory that stores the cipher key.

A personalization mechanism is used to initialize a smart card with a unique key in one embodiment of the invention. The key is only used for that one card. A second smart card receives a different key via a personalization mechanism.

In an embodiment of the invention, a set of future keys are generated from an initial key. The card retains the set of future keys in its memory. A key is selected from the set of future keys for use in a single transaction and is then discarded. Once the set of future keys are generated, the card removes the initial key from its memory. The initial key is used only for initialization purposes and not in transactional operations.

In one or more embodiments of the invention, an authentication technique is used to authenticate a merchant card with a consumer card. In one embodiment of the invention, a bilateral authentication technique is used whereby a merchant card authenticates itself to the consumer card and vice versa.

The set of future keys stored in the consumer card are used in bilateral authentication between cards. When a card is used for a transaction, one of the set of future keys is selected as a current key for the transaction. The current key is then erased from memory and is not used in any further transaction. The set of future keys can further be used to select a current key for interactions between a card and a financial institution such as in a settlement interaction.

In an exemplary environment, the invention is used with smart cards issued to a merchant and consumer to transact the payment of goods and/or services. The consumer and merchant cards establish communications in some manner using whatever communication protocol is appropriate for them. At the start of each transaction between cards, the cards transmit information that is used to perform bilateral authentication to authenticate each card with the other.

The bilateral authentication process first authenticates the merchant card with the consumer card. If the merchant card is successfully authenticated, the consumer card authenticates itself with the merchant card. If the consumer card successfully authenticates itself with the merchant card, the cards can transmit transaction information to effect payment.

The authenticating card (e.g., the consumer card) generates a random number that is encrypted using the authenticating card's current key. The unauthenticated card (e.g., merchant card) must determine the correct value of the random number and return it to the authenticating card to authenticate itself with the authenticating card. To do so, the unauthenticated card must first determine the authenticating card's current key.

In an embodiment of the invention, the unauthenticated card uses a key identifier that is received from the authenticating card to determine the authenticating card's current key. The key identifier was sent by the personalization system to the authenticating card during personalization. The key identifier contains non-variable identifying information concerning, e.g., the card and issuer and variable information such as a counter. The key identifier is retained in the card and used during bilateral authentication. In addition, the unauthenticated card uses a derivation key that was transferred to the unauthenticated card during personalization as well as a key calculation algorithm to determine the authenticating card's current key.

The unauthenticated card generates a random number as well. The unauthenticated card encrypts this random number using its derived value for the authenticating card's current key. The unauthenticated card uses the derived current key to encrypt the result of an exclusive-or operation between both cards random numbers. To authenticate itself with the unauthenticated card, the authenticating card must derive the unauthenticated card's random number and return it to the unauthenticated card.

To derive the value of the unauthenticated card's random number, the authenticating card uses its current key to decrypt the unauthenticated card's transmissions. This yields the result of the exclusive-or operation and the unauthenticated card's random number. The authenticating card extracts the derived value of its random number from the exclusive-or result using the decrypted value of the unauthenticated card's random number. The authenticating card verifies the value of the random number derived by the unauthenticated card to authenticate the unauthenticated card.

The authenticating card uses its current key to encrypt the value that it derived for the now authenticated card's random number. It sends the encrypted message to the authenticated card which decrypts the message to yield the random number derived by the authenticating card. The authenticated card verifies the derived random number with its random number to authenticate the authenticating card.

The bilateral authentication of the invention does not use a common key that is known to all of the cards in the system. Instead, a card must derive the key from information that it has or that is given to it at the time of the transaction. As discussed above with reference to an embodiment of the invention, a card derives a value for a random number generated by the other card to authenticate itself with the other card. Bilateral authentication is successful when both cards verify that the other card derived the correct value for its random number.

In one embodiment of the invention, two bilateral authentications occur for each transaction. In this embodiment, two different master keys and their corresponding derived keys are used. The first master key resides in the merchant card(s) and that master key's corresponding derived unique keys reside in the consumer card(s). The second master key resides in the consumer card(s) and that master key's corresponding derived unique keys reside in the merchant card(s).

As in the previous embodiment, the merchant card authenticates the consumer card and is itself authenticated by the consumer card using the master key resident in the merchant card and the derived unique keys resident in the consumer card. However, in this embodiment, a second bilateral authentication is performed using the second master key residing in the consumer card and derived unique key residing in the merchant card. This second bilateral authentication is identical in process to the prior but with the respective roles of the merchant and consumer cards reversed. The consumer card authenticates the merchant card and is itself authenticated by the merchant card using the master key resident in the consumer card and the derived unique keys resident in the merchant card.

This double bilateral authentication mitigates the remaining exposure to compromise existent in the merchant card's retention of a master key. In this embodiment no single compromise of any individual device compromises more than that unique device.

DETAILED DESCRIPTION OF THE INVENTION

A method and apparatus for asymmetrical key management in a symmetric key cryptographic system is described. In the following description, numerous specific details are set forth to provide a more thorough description of the present invention. It will be apparent, however, to one skilled in the art, that the present invention may be practiced without these specific details. In other instances, well-known features have not been described in detail so as not to obscure the invention.

Overview

The invention reduces the risks associated with the management of keys in a cryptographic system. Embodiments of the invention introduce levels of diversification to manage the keys in a cryptographic system thereby reducing the risks associated with unauthorized access and use of a key.

In an undiversified cryptographic system (e.g., a system that uses static symmetric key management), the same key is given for both the sender and receiver. An unauthorized person can compromise the entire system by determining the value of the key. For example, by knowing the key, an unauthorized person can use the key to impersonate either a sender or a receiver. Further, the unauthorized person can effect both future and past transactions of the system. Thus, knowledge of a single key by an unauthorized person results in a breach of the entire system.

Figure 1:
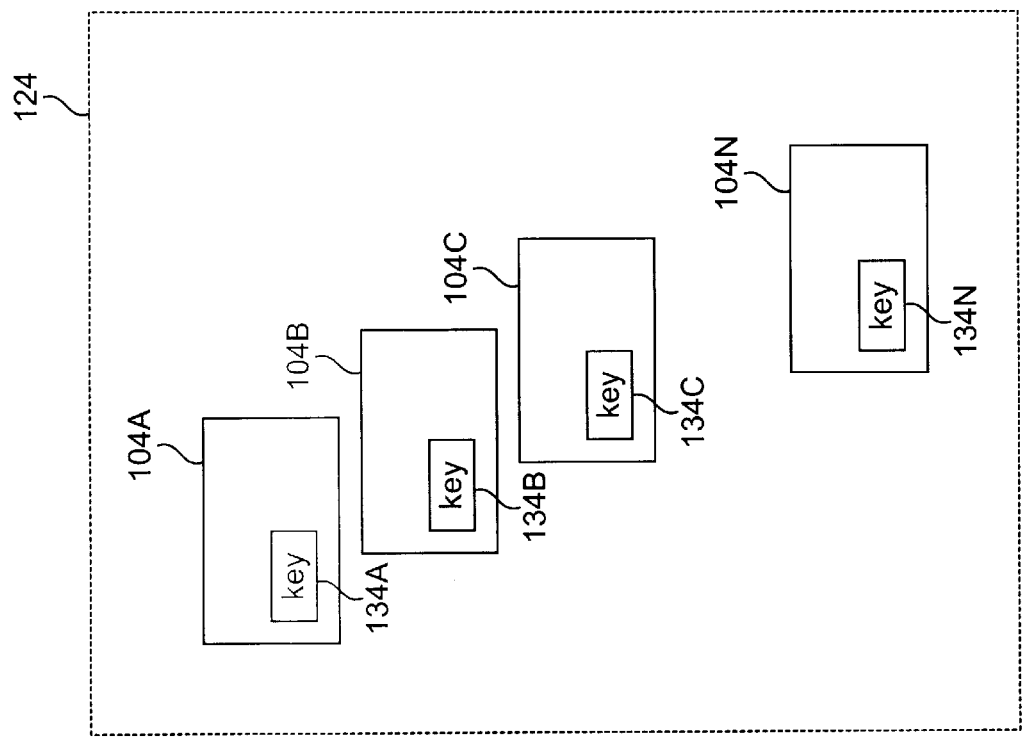
FIG. 1 illustrates computing devices in a cryptographic system.
Figure 1:
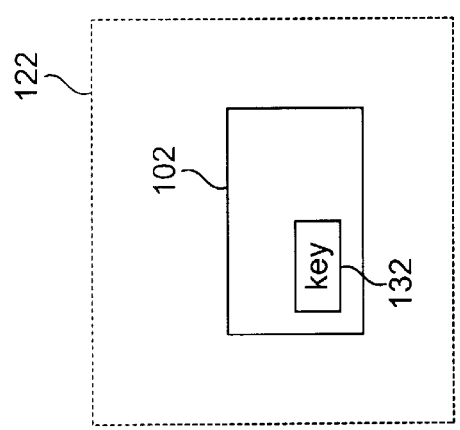

FIG. 1 illustrates computing devices in a cryptographic system. In an undiversified cryptographic system using symmetric key management, keys 132 and 134A–134N are the same. If unauthorized access to computing device 104C successfully determines the value for key 134C, each computing device's key is known. For example, it is possible to impersonate computing device 102 using key 134C obtained from computing device 104C. The impersonator can send and receive messages in the undiversified cryptographic system as computing device 102 using key 134C. Further, the impersonator can use key 134C to unscramble information encrypted by computing devices 102 and 104A–104N either before or after the cryptographic system was breached by the impersonator. It would be impossible to detect a modification made to the information by an impersonator. Thus, if one computing device is compromised, the entire system is compromised. Past and future information generated in the system is also compromised, if one computing device is compromised.

In one embodiment of the invention, a level of diversification is added to the cryptographic system such that a different static key is used by each computing device. Diversification using a static key can be illustrated using the cryptographic system of FIG. 1. Computing devices 102 and 104A–104N use a different key value, where device 102 retains a master key 132 but devices 104A–104N use diversified keys 134A–134N, respectively. That is, keys 132 and 134A–134N do not have the same value. Thus, a successful breach of computing device 104C that yields the value of 134C does not result in the ability to impersonate another computing device in the system (e.g., computing devices 102, 104A, 104B, or 104N). Only if device 102 is breached is there an ability to impersonate other devices. The key is a static key in that it is used for each transaction between the sender and receiver. Thus, once a computing device is breached, the key can be used to make undetectable modifications for both past and future transactions involving the computing device.

In another embodiment of the invention a level of diversification is used in which a different key is used per computing device per transaction. The key that is used by a computing device is dynamic (e.g., the key is changed with each transaction). Once the key is used to encrypt information, it is destroyed. It is therefore unavailable to anyone attempting to determine a key or keys of a computer device. A successful breach yields only future keys (e.g., keys that may be used by a computing device in the future to encrypt information). Thus, for example, keys 134A–134N of computing devices 104A–104N are dynamic. If key 134A is used by computing device 104A, it is removed from computing device 104A. In this embodiment, key 134A can be used to generate additional future keys for computing device 104A before it is removed. Further, key 132 can be a master key that is used to generate keys 134A–134N.

In the cryptographic system of FIG. 1, computing devices 102 and 104A–104N can exist in environments that provide different levels of control, or access to the computing device. The potential for tampering is less in a more controlled environment. Computing device 102 exists in environment 122 and computing devices 104A–104N exist in environment 124.

It may not be possible for both environments to provide the same level of control. If, for example, environment 122 provides a more controlled environment than environment 124, the potential for tampering that leads to a breach of key 132 is likely to be less than the potential for breach of keys 134A–134N. This may be the case where, for example, computing devices 104A–104N are distributed to the general public.

Either a static or dynamic key diversification technique can be implemented in the environment that is less controlled. The effect of a breach can be reduced, however, if a dynamic key diversification technique is used in the lesser controlled environment.

Referring to FIG. 1, assume that environment 124 is less controlled than environment 122 and keys 134A–134N are static keys. A breach of key 134C will affect previously encrypted information. Additionally, the value of key 134C obtained from the breach can be used to affect information that is subsequently encrypted using key 134C.

If a dynamic key diversification technique is used, key 134C cannot affect previously encrypted information. For example, successful breach of computing device 104C yields key 134C that has not yet been used. It is therefore not possible to use key 134C to modify previously generated information.

Key 132 can be a master key that is used to generate keys 134A–134N. Assuming, for example, key 132 can also be used to determine the value of keys 134A–134N, it is preferable for key 132 to be resident in a more controlled environment. If, for example, key 132 is breached and it can be used to determined keys 134A–134N, the entire system is compromised including the information that generated before and after the breach.

Key 132 can be single length (e.g., 56 bits), double length (e.g., 112 bits), or triple length (e.g., 168 bits). The following identifies methods for encrypting data using single, double, or triple length keys to. The result of a method can be used as a unique key, for example.

1. Single Length:
   Key 132 is $K_1$. Method=$eK_1(data)$;
2. Double Length:
   Key 132 is $K_1$, $K_2$. Method=$eK_1(dK_2(eK_1(data)))$;
3. Triple Length:
   Key 132 is $K_1$, $K_2$, $K_3$. Method=$eK_3(dK_2(eK_1(data)))$;

Where K1, K2, and K3 are all single length keys, "e" represents an encryption operation, and "d" represents a decryption operation.

Smart Card Cryptographic System

In one specific embodiment to be described, the invention can be used in a smart-card-based off-line pre-authorized payment system. However, the invention can be used in any environment to minimize the risks associated with the distribution and use of cryptographic keys.

For example, embodiments of the invention may be used to authenticate terminals, portable computing devices, or other computing equipment. Those skilled in the art will also recognize that embodiments of the invention may be used for the authentication of smart card devices as well as other computing devices in applications other than payment transactions, such as identification cards, health cards, or the like.

The term "smart card" refers to a card, such as a bank card, that has data storage and computing ability. In one application, a smart card can be used to pay for goods and services. The card's storage can be used to store a credit balance that can be used to authorize the payment.

Typically, when one submits a card to a merchant to make payment, the merchant connects to an authorization center to obtain authorization to charge the amount of the payment to the cardholder. The connection that is made with the authorization center is via a telephone line, for example. If the authorization center authorizes payment, the information associated with the payment transaction is captured and charged to the cardholder using the same type of connection. This type of environment is referred to as an "on-line" environment. An "on-line" scheme requires that information residing at one site be transmitted to another site via a live connection such as a network or dial-up connection.

"On-line" environments are used quite extensively in the United States and other countries that have the telecommunications infrastructure needed to support a live connection. There are, however, a number of countries that do not have the telecommunications infrastructure needed to make "on-line" transactions practical. For these countries, an "off-line" scheme can be used that does not require a live connection between the local site and a central location. In an "off-line" scheme, information is used and stored at a local site until the information can be submitted to a central location. For example, the merchant may access information stored on the cardholder's card to determine whether the transaction can be authorized "off-line". If so, the merchant can retain information about the transaction for subsequent submittal to a settlement center. Submittal of the transaction information may be accomplished by physically or electronically sending the information to a settlement center, for example.

A smart card-based application can be use in an off-line environment to eliminate the need to contact an authorization center. That is, the information needed to authorize use of the smart card is resident locally thereby eliminating the need to contact a remote site to effect a transaction.

In a smart card-based payment application in an off-line environment, embodiments of the invention are used with two smart cards, such as a merchant card and a consumer card, that are linked in some manner to allow information to be transmitted between the cards. A link can be formed between merchant and consumer cards in a smart card-based payment application using a two-card reader terminal, for example. At the start of a transaction, the linkage is used by the cards to perform bilateral authentication. If the bilateral authentication is successful, the cards can interact via the linkage to perform a transaction. For example, a consumer cardholder can make payment for goods or services using the consumer card. In one embodiment, payment, or transaction, information is received and retained by the merchant card.

Preferably, a consumer card is initialized before it is used to make payment. In a pre-authorized payment system, the consumer's card is initialized with a pre-authorized spending limit. During initialization, the consumer links to a financial institution that issued the card and at which the consumer has an account. The link can be established by, for example, bringing the card into the financial institution.

The consumer requests a pre-authorized spending amount. A determination is made whether to grant the request. If there are enough funds in the consumer's account to cover the pre-authorized spending amount, for example, the request is granted. Other criteria for granting the request (e.g., credit history) can be used to determine whether the request is granted.

The pre-authorized spending amount (a credit value) is then stored in the smart card. As a result of the pre-authorization, the card contains a credit balance that is equal to the pre-authorized spending amount. Funds equaling the requested pre-authorized spending limit need not be transferred from the payer's account at this time. The funds can remain in the account until a payment transaction is to be settled (e.g., after the card is used in a payment transaction and the payee submits the transaction information to receive payment). The funds kept in the payer's account can be frozen. Alternatively, they can be put in a shadow account, for example. However, it is not necessary to use the funds to make payment in advance of the card's use as in a pre-payment scheme.

When a consumer's card is used to make payment, the payment transaction is recorded by the merchant. The consumer's pre-authorized spending amount stored in the consumer's card is reduced by the amount of the transaction. The merchant submits the payment transaction for settlement to receive payment or credit for the transaction. As a result, the funds associated with the consumer's pre-authorized spending amount are reduced by the amount of the transaction. Thus, a debit of funds in a consumer's account occurs after the consumer uses the card in a transaction. In a pre-payment scheme, funds are debited when the card is initialized prior to the card's use in a payment transaction.

When a consumer presents a card to make payment, the consumer's smart card is linked to the merchant's smart card via a dual-card card reader or terminal, for example. The payment process using the two smart cards results in the consumer card's credit balance being debited and the merchant card's credit balance being credited for the amount of the purchase.

A card such as a smart card can therefore be used to perform such acts as initialize the card with a pre-payment amount, to make payment, and to retain payment information that is later submitted for settlement. If information is left in an unscrambled form, it would be possible to access the information to make unauthorized transactions. For example, it would be possible to obtain a payer card and establish a pre-authorized spending amount against someone else's account or to make a payment using another's pre-authorized spending limit. A merchant card could be accessed to modify information regarding a previous transaction (e.g., raise of lower the amount of the payment) or to generate counterfeit transactions.

Some or all of the information transmitted between the cards may be considered confidential information that needs to be encrypted before it is transmitted. Encrypted information is received and can be decrypted by the other card. In prior art methods, the same key is stored in both cards and used to encrypt and decrypt the information. The invention eliminates the need to store the same key in both cards thus minimizing the risks due to card tampering. That is, the cryptographic key that is used to encrypt the data is known initially to a first one of the cards. The second card determines the cryptographic key used by the first card. The second card uses the derived key to determine the random number being used by the first card. The second card must return a valid value for the random number to the first card to authenticate itself to the first card. A similar approach is taken to authenticate the first card to the second card.

In one embodiment, a unique cryptographic key is used for each card-to-card transaction. Alternatively, the same cryptographic key can be used for multiple transactions. For example, a static key can be used for encrypting a value such as a serial number.

The cryptographic key is generated in the card using information supplied to the card by a personalization system. Before a card can be used, it is first personalized. During the personalization process, information is sent to the card. A key calculation routine is used to calculate one or more cryptographic keys.

Figure 2:
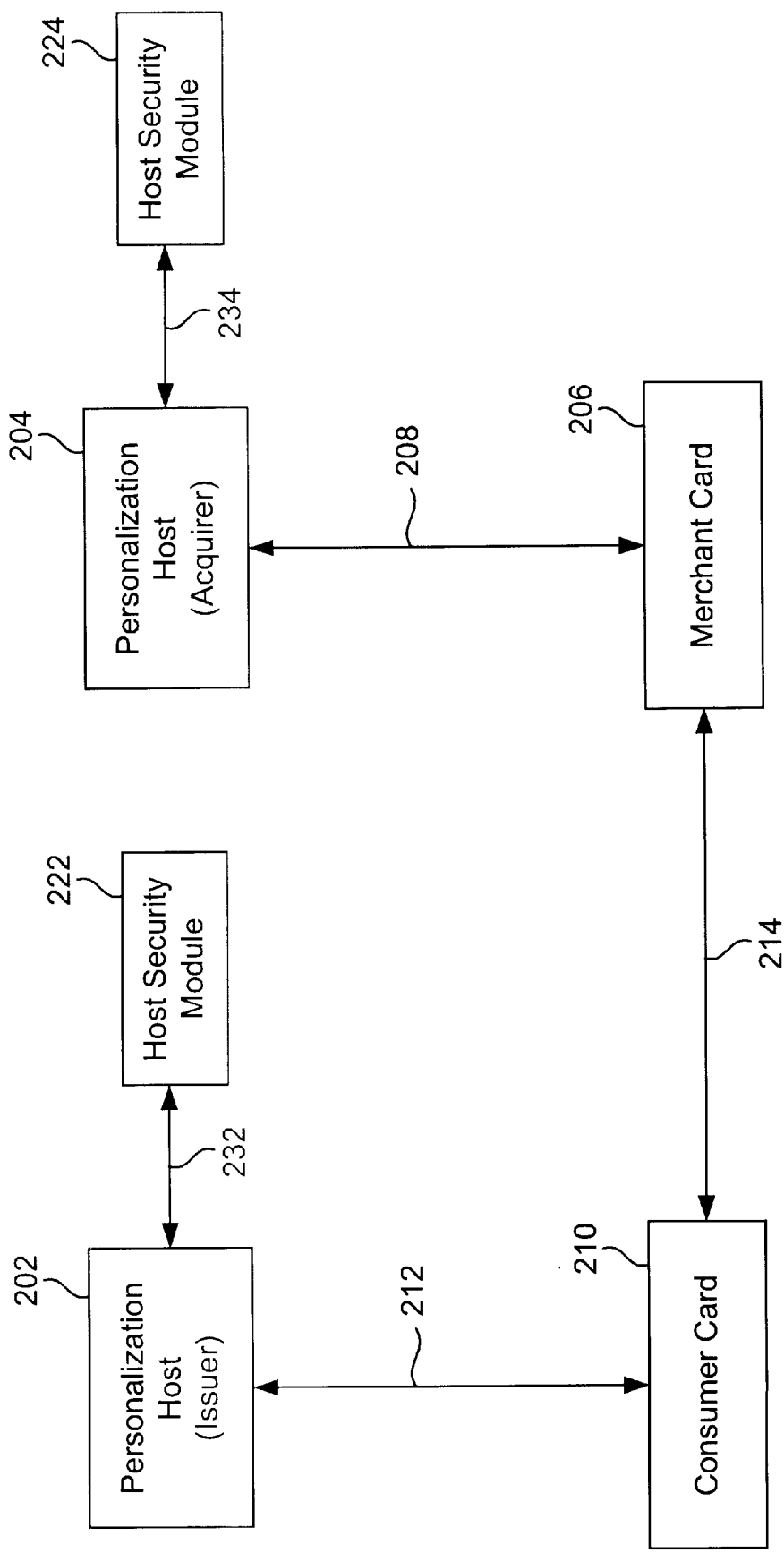
FIG. 2 provides a topographical view of personalization systems according to an embodiment of the invention.

FIG. 2 provides a topographical view of two personalization systems according to an embodiment of the invention. Consumer card 210 accesses personalization host 202 via connection 212. Connection 212 is a physically secure connection. Connection 212 is used to transfer information between personalization host 202 and consumer card 210.

Personalization host 202 initializes consumer card 210 so that consumer card 210 may be used to conduct, e.g., payment transactions. Initialization information includes, for example, the cardholder's name and a maximum authorized spending amount. After initialization, consumer card 210 can be loaded with a value to be used for payments up to the maximum authorized spending amount.

Once consumer card 210 has been initialized, consumer card 210 can be used to, for example, make payment up to the value "loaded" or the maximum authorized amount for goods and/or services. To make payment, consumer card 210 communicates with merchant card 206 via link 214. Link 214 may be comprised of a two-card reader terminal in which consumer card 210 and merchant card 206 are inserted. Merchant card 206 retains information, collection or transaction information, including the amount of the payment. Merchant card 206 must forward the collection information to host 204 to obtain payment. Merchant card 206 accesses host 204 via connection 208.

When a consumer card (e.g., consumer card 210) is used to purchase an item or service, a transaction record is built using one of the set of transaction. The set or batch of transactions is transmitted to an acquirer for settlement during collection. For example, if host 204 is the acquirer institution for merchant card 206, the batch is sent to host 204 for settlement.

Data collection can be performed using connection 208. For example, the card is either mailed or brought to the actual owner of the card (i.e., the acquirer) and is inserted into a reader that reads the batch information to submit the batch information to host 204.

Consumer Card Personalization

Figure 3:
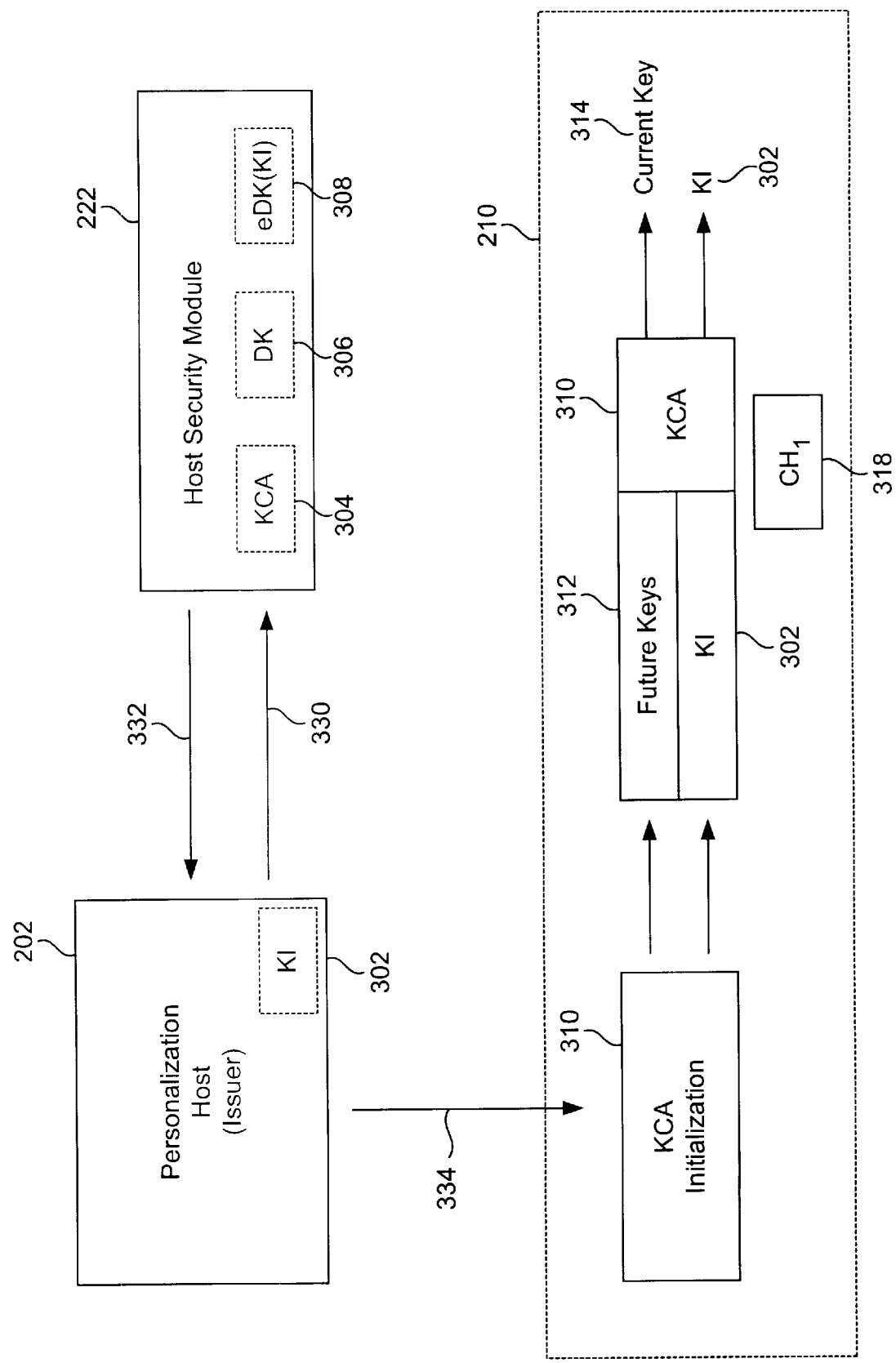
FIG. 3 provides a topographical view of a personalization system used to generate and transmit security parameters for a consumer card according to one embodiment of the invention.

FIG. 3 provides a topographical view of a personalization system used to generate and transmit security parameters for a consumer card according to one embodiment of the invention. Personalization host 202 retains key identifier (KI) 302. Host security module (HSM) 222 can be resident in personalization host 202. Alternatively, HSM 222 can be resident in another system that is somehow networked or interconnected to personalization host 202.

Personalization host 202 transmits KI 302 to HSM 222 via transmittal 330. A variable portion of KI 302 can contain a certain number of bits that includes a counter. KI 302 can further include a fixed portion that contains information associated with the card. HSM 222 includes a key calculation algorithm (KCA) 304 and a derivation key (DK) 306. KCA 304 is, for example, Derived Unique Key Per Transaction (DUKPT). A discussion of DUKPT is provided in ANSI standard X9.24 "Financial Services Retail Key Management" American National Standard for Financial Services ANSI/ABA. X9.24-1992 which is incorporated herein by reference. DUKPT is one mechanism for calculating a unique key. Other key calculation algorithms can be used with the present invention including CIBC's Dynamic Key Per Transaction.

KCA 304 is used with DK 306 to generate an initial key, eDK(KI) 308. HSM 222 transmits eDK(KI) 308 to personalization host 202 via transmittal 332. Personalization host 202 forwards eDK(KI) 308 to consumer card 210 along with KI 302 via transmittal 334.

KI 302 and eDK(KI) 308 are used to initialize KCA 310. Once initialized, KCA 310 generates a plurality of future keys 312. Future keys 312 are generated by, for example, re-encrypting eDK(KI) 308 using DK 306. Future keys 312 and KI 302 are stored in consumer card 210. Preferably, eDK(KI) 308 is deleted from storage of consumer card 210 once future keys 312 are generated by KCA 310. Thus, there is no direct evidence of the initial key, eDK(KI) 308. Future keys 306 contains keys that are used during bilateral authentication performed between consumer card 210 and merchant card 206. Future keys 306 are stored in a location in memory 106 of FIG. 1, for example.

The amount of key storage can be determined by identifying the number of keys needed for a card. Assuming that a unique key is used for each transaction, the number of keys can be determined, for example, by estimating the number of transactions per day and the life of the card. For example, if five transactions are likely to occur per day with a card that has a life of three years, the total number of keys needed is: 5*365*3 or 5,475. The following table illustrates the amount of storage (in bytes) based on the number of keys.

| Number of Possible Keys | Number of Keys Stored | Storage (Bytes) |
| --- | --- | --- |
| $2^8 = 256$ | 8 | 64 |
| $2^9 = 512$ | 9 | 72 |
| $2^{10} = 1024$ | 10 | 80 |
| $2^{11} = 2048$ | 11 | 88 |
| $2^{12} = 4096$ | 12 | 96 |
| $2^{13} = 8192$ | 13 | 104 |
| $2^{14} = 16384$ | 14 | 112 |

The table illustrates examples of storage amounts for use with the invention. Other storage amounts can be used with the invention. The table includes columns that identify the number of stored keys, the number of possible keys that can be derived from the stored keys and the amount of storage (in bytes) needed for the stored keys. For example, if it is assumed that 5,475 keys are needed (see example above), a total of 104 bytes are needed for the stored keys. A total of 8,192 keys are possible from the thirteen stored keys.

FIG. 3 illustrates an embodiment of the invention that includes future keys 312 from which a current key is derived for a transaction. In an alternate embodiment of the invention, a unique key is provided to consumer card 210 during personalization. The unique key provided during personalization is used in each transaction. Consumer card 210 does not derive and store future keys 312. Consumer card 210 stores one unique key that is used for all transactions. However, in both the static and dynamic diversification embodiments of the invention, the unique key that is used by consumer card 210 is not the same as another card's unique key.

Merchant Card Personalization

Figure 4:
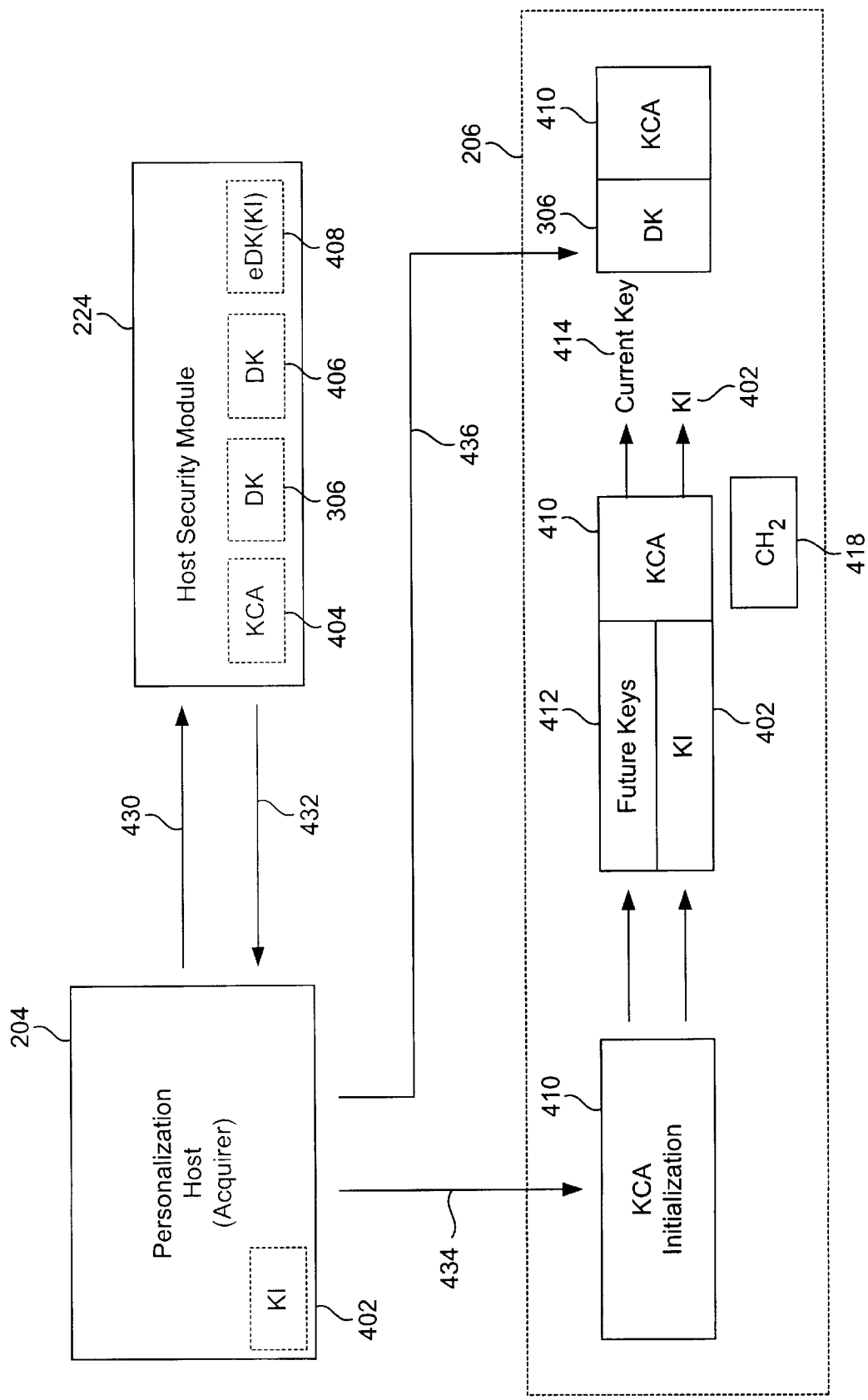
FIG. 4 provides a topographical view of a personalization system used to generate and transmit security parameters for a merchant card according to an embodiment of the invention.

Merchant card 206 is also personalized before use. FIG. 4 provides a topographical view of a personalization system used to generate and transmit security parameters for a merchant card according to one embodiment of the invention. Personalization host 204 retains KI 402 that is transmitted to HSM 224 via transmittal 430. HSM 224 includes KCA 404, derivation key (DK) 406, and DK 306. KI 402 is encrypted by HSM 224 using DK 406 as the encryption key to yield eDK(KI) 408. HSM 224 transmits eDK(KI) 408 to personalization host 204 along with DK 306 via transmittal 432.

Personalization host 204 transmits KI 402 and eDK(KI) 408 to KCA 410 via transmittal 434. KCA 410 uses eDK(KI) 408 to generate a plurality of future keys 412. Future keys 412 are generated by, for example, re-encrypting eDK(KI) 408 using DK 406. When future keys 412 are generated, eDK(KI) 408 is preferably removed from storage in merchant card 206. There is therefore no direct evidence of the initial key, eDK(KI) 408. Future keys 412 and KI 402 are retained in merchant card 206, e.g., in memory 106 of FIG. 1. The amount of memory needed to store the future keys 412 can be determined, for example, as described above. In addition, merchant card 206 retains a copy of DK 306 for consumer card 210. Merchant card 206 uses DK 306 during bilateral authentication as described below.

KCA 404 used by HSM 224, KCA 304 used in HSM 222, KCA 410 of merchant card 206 and KCA 310 of consumer card 210 are key calculation algorithms used during personalization and bilateral authentication. The same key calculation algorithm can be used for each of these. Alternatively, different key calculation algorithms can be used for one or all of them.

Future keys 312 and KI 302 in consumer card 210 are used in conjunction with DK 306 in merchant card 206 to bilaterally authenticate the cards. Bilateral authentication is used to verify or authenticate two cards with each other.

FIG. 4 illustrates an embodiment of the invention that includes future keys 412 from which a current key is derived for a transaction. In an alternate embodiment of the invention, a unique key is provided to merchant card 206 during personalization. The unique key provided during personalization is used for each transaction (e.g., settlement interaction with personalization host 224). Merchant card 206 does not derive and store future keys 412. Merchant card 206 uses one stored unique key. The unique key that is used by merchant card 206 is not used as a unique key by another card.

Card-to-Card Bilateral Authentication

In embodiments of the invention, bilateral authentication is performed between at least two cards. It is preferably performed prior to entering into a transaction (e.g., payment). The bilateral authentication of the invention does not use a global key that must reside in each card to encrypt the information sent between them as is done in the prior art. Instead, the authenticating card uses a key, referred to as a current key, to encrypt information. The authenticating card's key (e.g., unique key or current key) is not initially known to a unauthenticated card. The key must be generated by the unauthenticated card based on information transmitted to it.

In one embodiment, the key that is generated by the unauthenticated card is used to determine the value of the challenge, or random number, which is then transmitted to the authenticated card. The authenticating card verifies that the challenge derived by the authenticated card is correct to authenticate the unauthenticated card. To authenticate the authenticating card to the newly authenticated card, the roles reverse such that the authenticated card becomes the authenticating card and the authenticating card the unauthenticated card.

Figure 6:
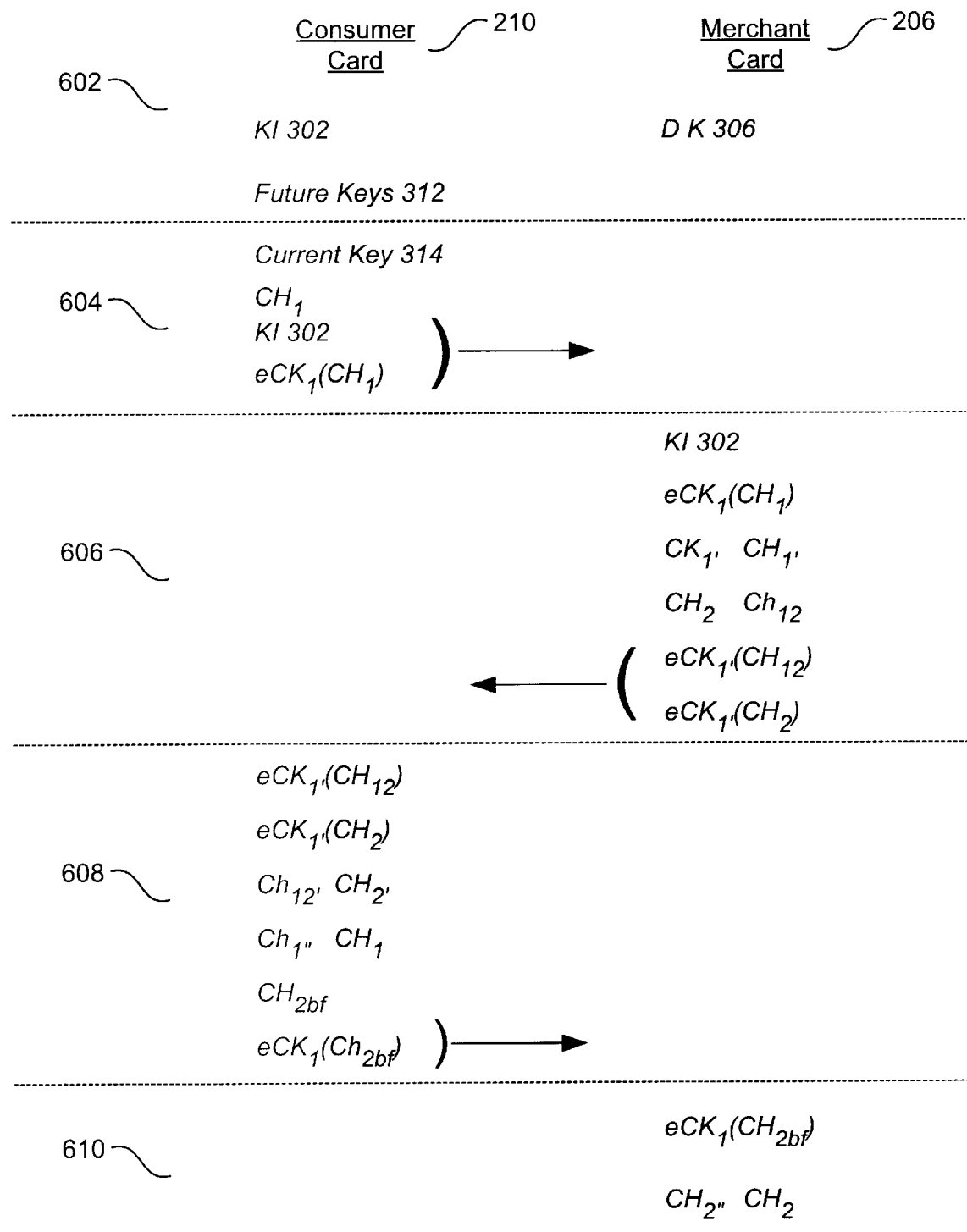
FIG. 6 is a state diagram according to an embodiment of the invention.

FIG. 6 provides a state diagram for bilateral authentication between a consumer card and a merchant card according to an embodiment of the invention. In state 602, consumer card 210 includes KI 302 and future keys 312. Merchant card 206 includes DK 306. At state 604, consumer card 210 selects current key (CK) 314 from future keys 312 and generates a first challenge ($CH_1$). Consumer card encrypts $CH_1$ using current key 314 to yield $eCK_1(CH_1)$. Consumer card transmits KI 302 and $eCK_1(CH_1)$ to merchant card 206.

At state 606, merchant card 206 has received KI 302 and $eCK_1(CH_1)$. Merchant card 206 uses these values to determine $CK_{1'}$ and $CH_{1'}$, the values it derived for $CK_1$ and $CH_1$. At state 606, merchant card 206 includes $CH_2$, a challenge value used by merchant card 206 to authenticate consumer card 210. Merchant card 206 generates $CH_{12}$ which is the result of an exclusive-or operation between $CH_{1'}$ and $CH_2$. Merchant card 206 encrypts $CH_{12}$ and $CH_2$ using $CK_{1'}$ and transmits the encrypted messages (i.e., $eCK_{1'}(CH_{12})$ and $eCK_{1'}(CH_2)$) to consumer card 210.

At state 608, consumer card 210 decrypts $eCK_{1'}(CH_{12})$ and $eCK_{1'}(CH_2)$ using $CK_1$ to obtain $CH_{12'}$ and $CH_{2''}$. Consumer card 210 extracts $CH_{1''}$ from $CH_{12'}$ using $CH_{2''}$. Consumer card 210 determines whether $CH_{1''}$ is equal to the value of $CH_1$. If not, merchant card 206 remains unauthenticated. If they are the same, consumer card 210 proceeds to authenticate itself with merchant card 206. It generates $CH_{2bf}$ which is the result of an exclusive-or operation between $CH_{2'}$ and a blinding factor. Consumer card 210 encrypts $CH_{2bf}$ using $CK_1$ (i.e., $eCK_1(CH_{2bf})$) and transmits the encrypted message to merchant card 206.

Merchant card 206 decrypts the encrypted message and extracts $CH_{2''}$ from $CH_{2bf}$ using the blinding factor. $CH_{2''}$ is examined to determine whether it has the same value as $CH_2$. If so, consumer card 210 is authenticated with merchant card 206.

The states described in FIG. 6 assume the use of future keys 312. In an alternate embodiment described above, a unique key is assigned to a card and used for each transaction. In this embodiment, the unique key is used in place of the current key in the states in FIG. 6. For example, in state 604 the unique key is used instead of current key 314 to encrypt the challenge.

Process Flow

Figure 5A:
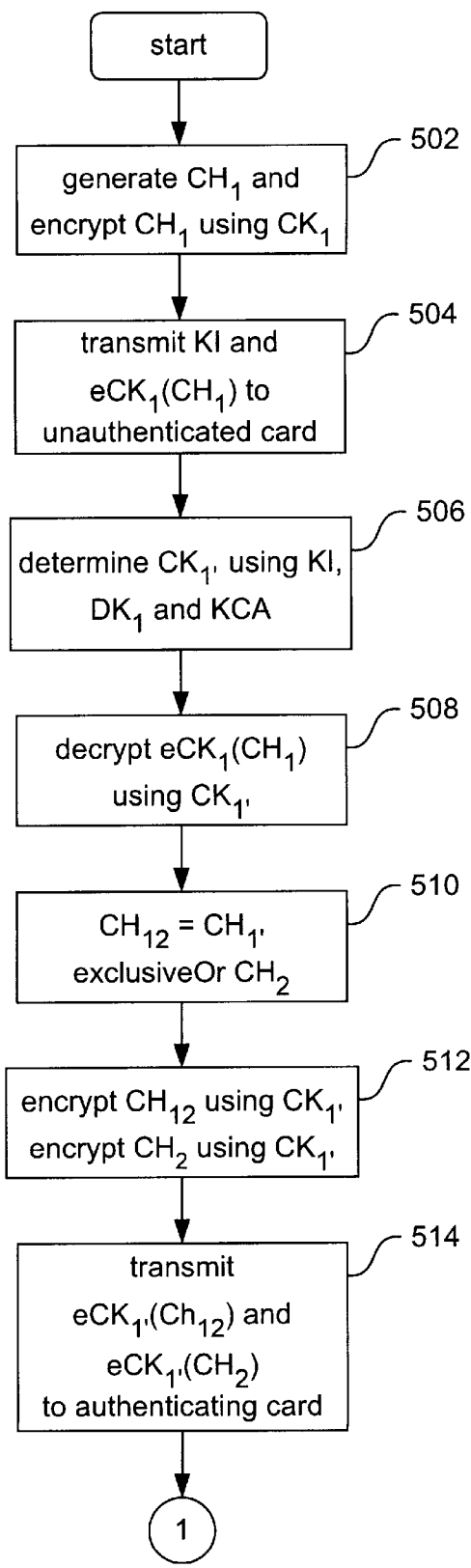
FIGS. 5A–5C provide an example of a bilateral authentication process flow according to an embodiment of the invention.
Figure 5B:
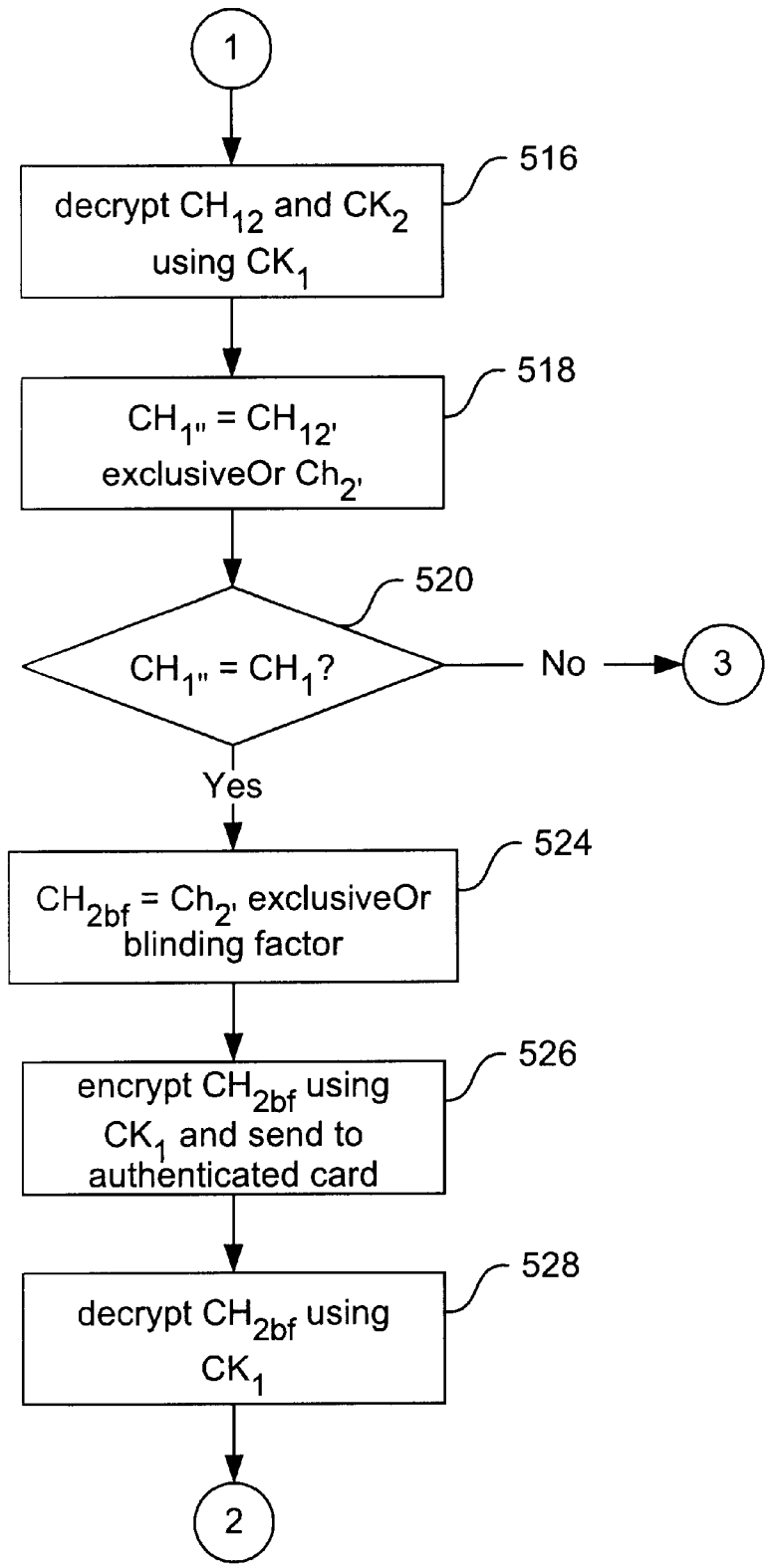
Figure 5C:
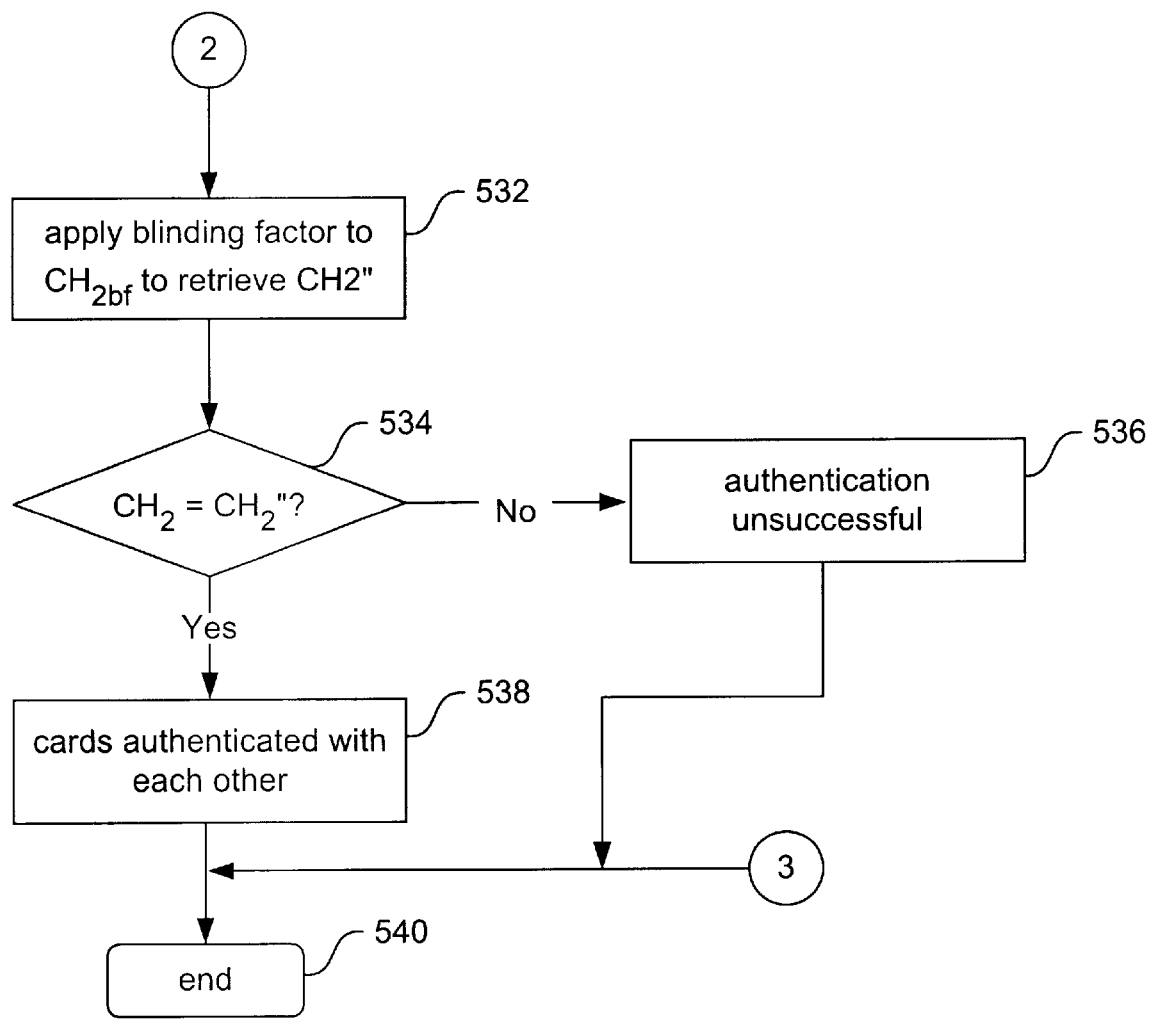

FIGS. 5A–5C provide an example of a bilateral authentication process flow according to an embodiment of the invention. At step 502, the authenticating device (e.g., consumer card 210) generates a parameter, $CH_1$ either randomly or using a counter, for example. It is this parameter that must be determined by the unauthenticated device and transmitted back to the authenticating device for a successful authentication. The authenticating device encrypts $CH_1$ using its current key, $CK_1$. At step 504, the authenticating device sends KI and the encrypted $CH_1$ (i.e., $eCK_1(CH_1)$) to the unauthenticated device (e.g., merchant card 206).

The unauthenticated device determines the authenticating device's current key, $CK_1$, using the value of KI sent by the authenticating device as well as the authenticating device's DK (e.g., DK 306) and a KCA at step 506. The value of $CK_1$ that is determined by the unauthenticated device is referred to as $CK_{1'}$. At step 508, the unauthenticated device decrypts $eCK_1(CH_1)$ using $CK_{1'}$ to retrieve a value for $CH_1$, or $CH_{1'}$.

Like the authenticating device, the unauthenticated device includes a parameter, $CH_2$, that is used to authenticate an unauthenticated device. At step 510, the unauthenticated device performs an exclusive-or operation with $CH_{1'}$ and $CH_2$. The result of the exclusive-or operation is referred to as $CH_{12}$. At step 512, the unauthenticated device encrypts $CH_{12}$ and $CH_2$ using $CK_{1'}$ (or $eCK_{1'}(CH_{12})$ and $eCK_{1'}(CH_2)$), respectively). At step 514, the unauthenticated device transmits $eCK_{1'}(CH_{12})$ and $eCK_{1'}(CH_2)$ to the authenticating device.

At step 516, the authenticating device decrypts $eCK_{1'}(CH_{12})$ and $eCK_{1'}(CH_2)$ using $CK_1$ to obtain $CH_{12'}$ and $CH_{2''}$. At step 518, the authenticating device determines $CH_{1''}$ by performing an exclusive-or operation with $CH_{12}$ and $CH_{2''}$. $CH_{1''}$ is the value of $CH_{1'}$ determined by the authenticating device to be the unauthenticated device's value for $CH_1$. At step 520 (i.e., $CH_{1''}=CH_1$?), the authenticating device makes a determination whether the value of $CH_1$ generated by the unauthenticated device and transmitted to the authenticating device (i.e., $CH_{1''}$) has the same value as the authenticating device's $CH_1$. If not, the authentication process is determined to be unsuccessful and the authentication process is terminated at step 540.

If it is determined at step 520 that the unauthenticated device returned the value of $CH_1$, processing continues to authenticate the authenticating device. The devices reverse roles. The authenticating device must now authenticate itself with the authenticated device.

At step 524, the authenticating device performs an exclusive-or operation with $CH_{2'}$ and a blinding factor to yield $CH_{2bf}$. The blinding factor is a parameter, known to both devices, that is used to protect against replay of $eCK(CH_2)$, sent from the unauthenticated device to the authenticating device in Step 514. At step 526, the authenticating device encrypts $CH_{2bf}$ using $CK_1$ (i.e., $eCK_1(CH_{2bf})$) and sends it to the authenticated device. The authenticated device decrypts $eCK_1(CH_{2bf})$ using $CK_{1'}$ at step 530 to yield $CH_{2bf'}$. At step 532, the authenticated device applies the blinding factor $CH_{2bf}$ to extract $CH_{2''}$.

At step 534 (i.e., $CH_2=CH_{2''}$?), the authenticated device determines whether the value of $CH_2$ generated by the authenticating device (i.e., $CH_{2''}$) is equal to the authenticated device's $CH_2$. If not, the authenticating device has not authenticated itself with the authenticated device and bilateral authentication fails. Processing ends at step 540. However, if the authenticating device sent a valid value for $CH_2$, both devices have authenticated themselves to the other. Therefore, bilateral authentication is successful at step 538. Additional processing can continue between the devices if desired. Bilateral authentication processing ends at step 540.

The steps described in FIGS. 5A–5C assume the use of future keys 312 from which a current key 314 is derived. As previously described, a unique key can be used for each transaction in place of a current key. In this alternate embodiment, the unique key is used as the current key in the steps of FIGS. 5A–5C.

Device Groups

Figure 7A:
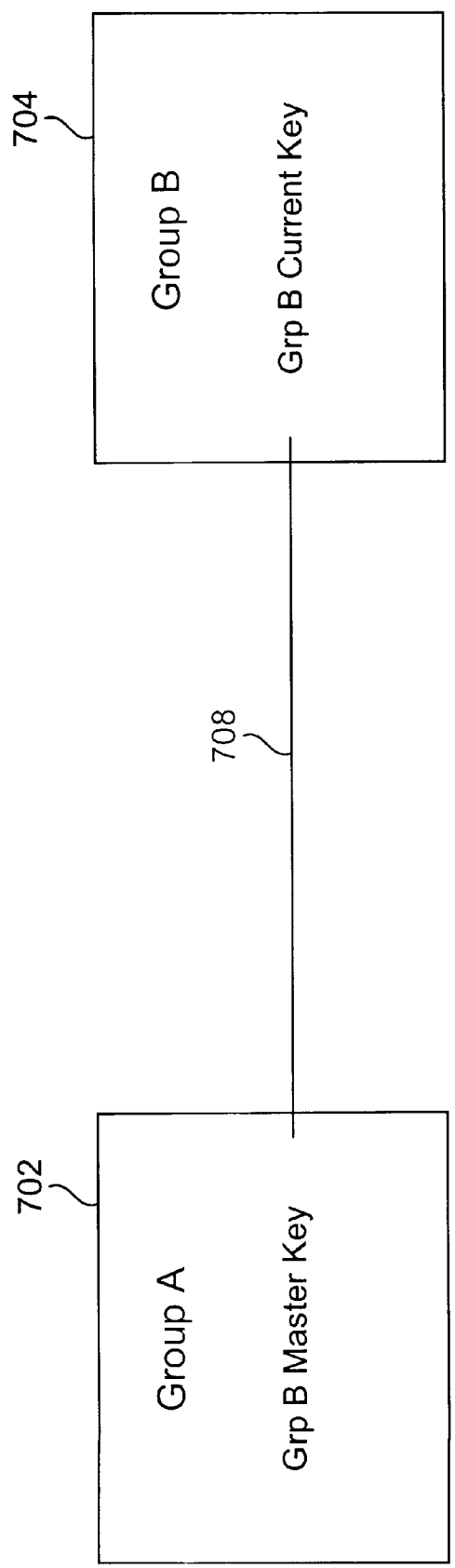
FIGS. 7A–7C provide device grouping examples according to embodiments of the invention.

In one embodiment of the invention, the cryptographic system is comprised of two groups or sets of devices. One set of devices (device group A) contains a master key such as the derivation key (DK 306) discussed above. Another set of devices (device group B) contains one or more keys that are derived from the master key. Where a set of keys are derived from the master key, one can be selected to act as a unique key in the current transaction between a group A device and a group B device (e.g., CK). FIG. 7A provides an example of a master key device group and a derived key device group according to an embodiment of the invention.

In this embodiment, group 702 devices contain the derivation key that is used to derive the key(s) for group 704 devices. Bilateral authentication 708 can be performed between a group 702 device and a group 704 device using the master and derived keys as previously discussed. For example, the group 702 device's key can be DK 306 and the group 704 device's key can be $CK_1$. FIGS. 5A–5B and 6 provide a discussion of bilateral authentication process that can be used for bilateral authentication 708.

As previously discussed, there is a risk associated with a system comprised of group 702 and 704 devices. If a group 702 device is compromised, the system becomes compromised. When a group 702 device is compromised, the master key is accessible and can then be used to impersonate either a group 702 device or a group 704 device, or both. If a group 704 device is compromised, the level of risk or compromise is dependent on the level of diversification. For example, if a unique key is used per transaction per card, only future transactions are compromised for the card that is compromised. The other devices in group 704 and none of the devices group 702 are compromised.

Figure 7B:
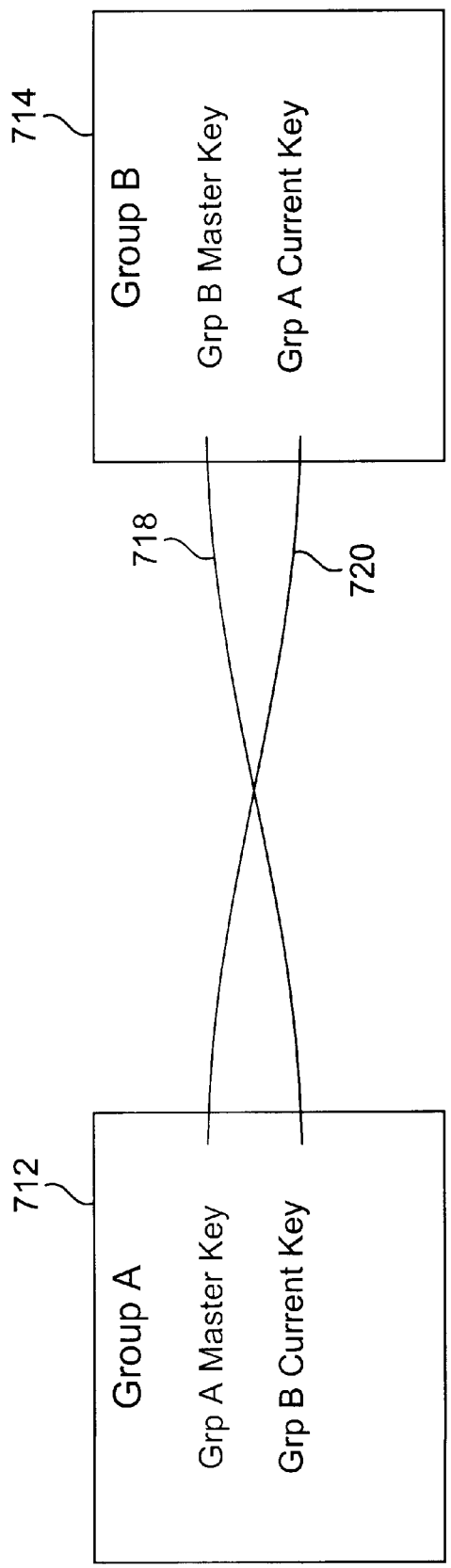

Another embodiment of the invention comprises two groups of devices. However, the devices in each group include both a master key that is unrelated to the master key of other group(s) and a key that is derived from each of the other groups' master keys. FIG. 7B provides an example of two device groups having both master and derived keys according to this embodiment of the invention.

Devices in group 712 have a key (i.e., Grp B Current Key) that is derived from a derivation key (Grp B Master Key) that is stored in group 714 devices. Conversely, devices in group 714 include a key (i.e., Grp A Current Key) that is derived from a derivation key stored in group 712 devices (i.e., Grp A Master Key). Grp A Master Key and Grp B Master Key are separate and unrelated keys. Thus, in this embodiment, a device includes a key (or keys) that is derived from a separate master key that is stored in the other group's device as well as its own group's master key.

Authentication between a group 712 device and a group 714 device can consist of a set of bilateral authentications. One bilateral authentication (bilateral authentication 718) can be done using the Grp B Master Key stored in the group 714 device and the Grp B Current Key stored in the group 712 device. If bilateral authentication 718 is successful, bilateral authentication 720 can be performed using the Grp A Master Key stored in the group 712 device and the Grp B Current Key stored in the group 714 device. Bilateral authentications 718 and 720 can be performed as discussed above.

In the system depicted in FIG. 7B, it is necessary to compromise a device from group 712 and group 714 to have a total system compromise. Bilateral authentications 718 and 720 require both the Grp A and Grp B Master Keys. If only one device is compromised, only one master key is compromised. It is not possible to successfully complete both bilateral authentications.

Figure 7C:
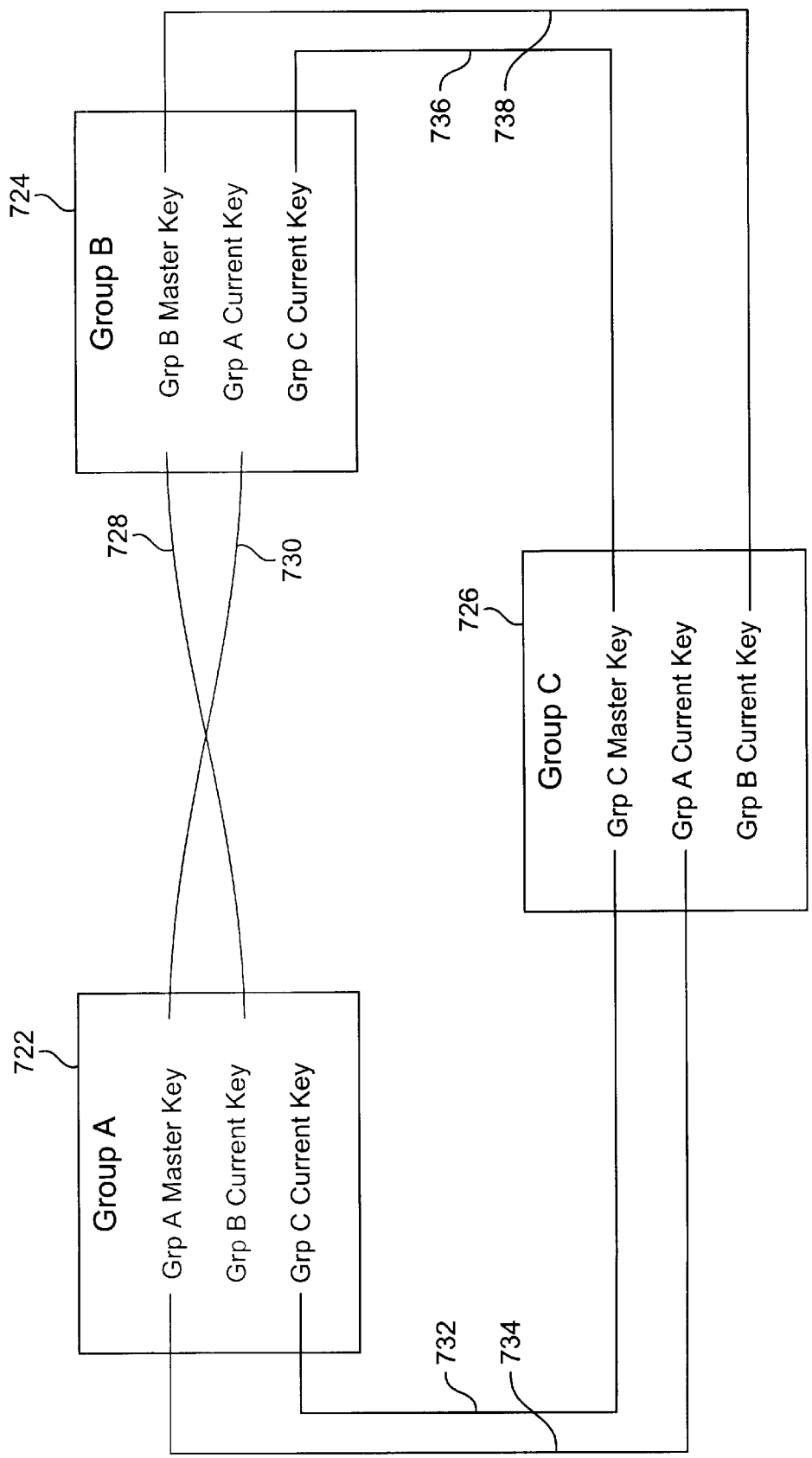

The embodiment illustrated in FIG. 7B can be extended to any number of groups. FIG. 7C illustrates another embodiment of the invention which extends the system of FIG. 7B. In the system of FIG. 7C, three groups are used. It should be apparent that the system can be extended to any number of groups.

Referring to FIG. 7C, the system comprises three groups of devices. In group 722, each device has the group's master key as well as a key derived from each of the other group's master keys. Thus, each group 722 device has the Grp A Master Key, Grp B Current Key and Grp C Current Key. A group 724 device includes keys (i.e., Grp A Current Key and Grp B Current Key) derived from the master keys of groups 724 and 726, and group 724's master key (i.e., Grp B Master Key). Keys (i.e., Grp A Current Key and Grp B Current Key) derived from the Grp A Master Key and Grp B Master Key (respectively) and Grp C Master Key are included in a group 726 device.

Bilateral authentication that is performed between two devices such as devices from groups 722 and 724 can comprise a dual bilateral authentication process as discussed above. For example, bilateral authentications 728 and 730 are performed between a device from group 722 and a device from group 724. Authentication is successful between the two devices, if both bilateral authentications 728 and 730 are successful. Bilateral authentications 732 and 734 are performed between devices from groups 722 and 726. Bilateral authentications 736 and 738 are performed between devices from groups 724 and 726.

To cause a total system compromise, it is necessary to compromise a device from each of groups 722, 724 and 726 of FIG. 7C. A device from each group must be compromised to obtain each group's master key. Compromising a device from one group yields only that group's master key. To impersonate a device in each group of the system, it is necessary to have compromised a device from each group.

The duplication and mirroring of the key scheme in each device group device (e.g., each device has a separate master key and key(s) derived from the other groups' master keys) in conjunction with a "double" bilateral authentication process ensures that the breach of any single device does not compromise the system. The degree of risk of a system comprising device groups is scalable. That is, it is necessary to compromise a device from each of the groups that comprise the system to compromise the entire system. In the two group system of FIG. 7B, for example, it is necessary to compromise a device from both groups. Similarly, in the three group system of FIG. 7C, a device from each of the three groups must be compromised, etc.

Embodiment of Computer Execution Environment (Hardware)

Figure 8:
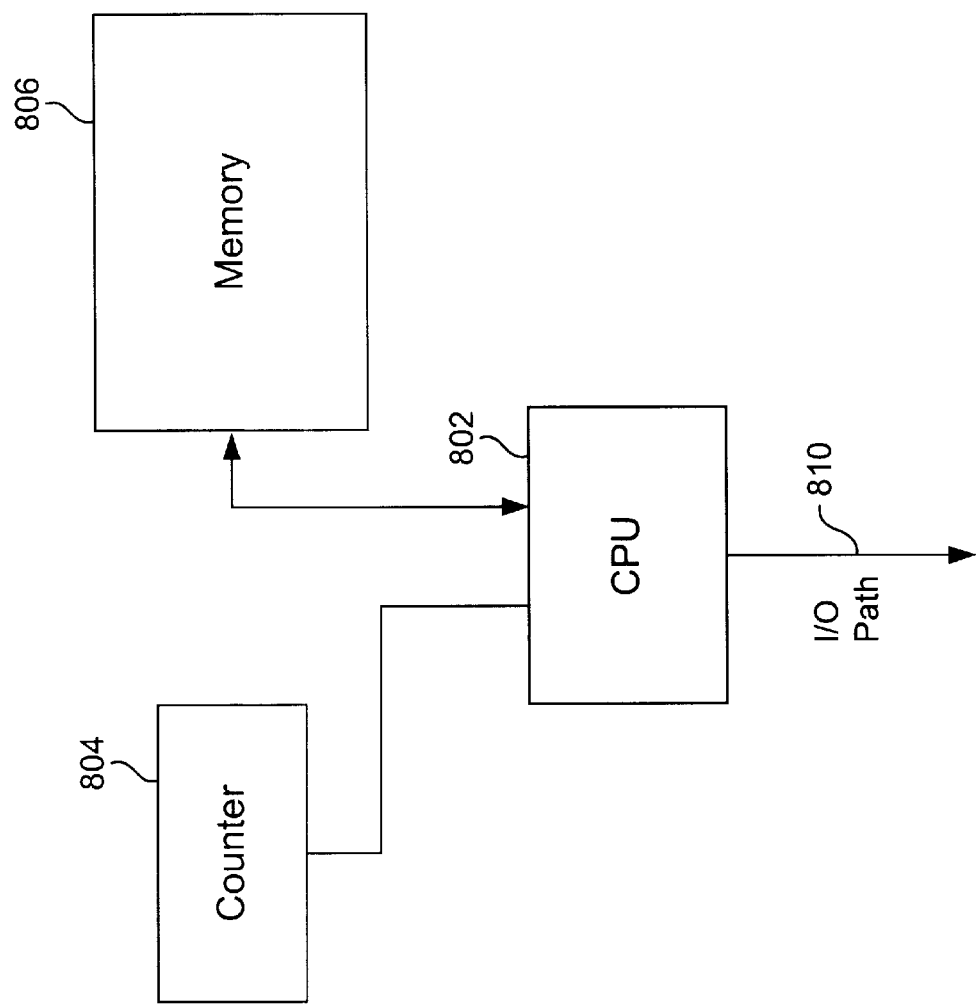
FIG. 8 provides a block diagram of a computing device components that can be used with embodiments of the invention.

FIG. 8 provides a block diagram of a computing device components that can be used with embodiments of the invention. It should be noted that other configurations can be used with the invention. Referring to FIG. 8, the device consists of a central processing unit (CPU) 102 that is used to perform cryptographic functions, including encryption and decryption, to derive keys, to compare values and to communicate with other devices and systems. The processor 802 is coupled to memory 806 that can be used to store one or more keys, e.g., future keys. A counter 804 is coupled to CPU 802 to provide a means of tracking transaction counts and generating random numbers, for example. CPU 802 communicates with other devices and systems through input/output path 810.

Thus, a method and apparatus for asymmetrical key management in a cryptographic system has been provided.

It is claimed:

1. A method of asymmetric key management in card-to-card transactions comprising the steps of:

generating an identifier, $KI_1$, and a derived key, $DK_1$, for a first card;

generating a key, $K_1$, using said $KI_1$ and $DK_1$;

installing $K_1$ in said first card;

generating an identifier, $KI_2$ and a derived key, $DK_2$, for a second card;

generating a key, $K_2$, that is different than said $K_1$ using said $KI_2$ and said $DK_2$; and installing said $K_2$ in said second card.

2. The method of claim 1 further comprising the step of generating a set of future keys.

3. The method of claim 2 further comprising the steps of:

using a future key from said set of future keys; and destroying said future key.

4. The method of claim 2 wherein said set of future keys is generated using said $K_1$.

5. The method of claim 4 wherein said future key is used in a single card-to-card transaction.

6. The method of claim 1 wherein said identifiers $KI_1$ and $KI_2$ include a variable portion and a constant portion.

7. The method of claim 1 wherein the step of generating $K_1$ further comprises the step of encrypting $KI_1$ using $DK_1$.

8. The method of claim 1 wherein the step of generating $K_2$ further comprises the step of encrypting $KI_2$ using $DK_2$.

9. The method of claim 1 further comprising the steps of:

installing in said second card said $DK_1$;

deriving a current key of said first card using said $KI_1$, DK and a key calculation algorithm.

10. The method of claim 9 wherein said current key is said $K_1$.

11. A method for bilaterally authenticating devices in a cryptographic system comprising the steps of:

determining a current key for a first device;

said first device generating a first message for a second device;

said second device determining a current key value using said first message;

said second device determining a first authentication value using said message and said current key value;

said second device generating a second message for said first device;

said first device extracting said first authentication value from said second message;

said first device determining whether said extracted first authentication value is the same as said first authentication value;

performing the following when said extracted first authentication value is the same as said first authentication value:

said first device determining a second authentication value from said second message;

said first device generating a third message for said second device;

said second device extracting said second authentication value from said third message; and said second device determining whether said extracted second authentication value is the same as said second authentication value.

12. The method of claim 11 wherein said current key is dynamically generated, said step of determining a current key comprising the steps of:

generating a plurality of future keys; and selecting said current key from said plurality of future keys.

13. The method of claim 12 further comprising the step of removing said current key from said plurality of future keys.

14. The method of claim 12 wherein said step of generating further comprises the steps of:

generating an initial key; and generating said plurality of future keys from said initial key.

15. The method of claim 14 wherein said step of generating uses a key calculation algorithm.

16. The method of claim 15 wherein said key calculation algorithm uses a derived unique key per transaction (DUKPT) scheme.

17. The method of claim 11 wherein said step of generating a first message further comprises the steps of:

generating said first authentication value;

encrypting said first authentication value using said current key; and including in said first message a key identifier, said key identifier used to determine said first authentication value.

18. The method of claim 11 wherein said step of determining a current key value further comprises the step of calculating said current key value using a key calculation algorithm, an initial key and a key identifier value.

19. The method of claim 18 wherein said initial key was used to generate said current key.

20. The method of claim 11 wherein said step of determining a first authentication value further comprises the step of decrypting an encrypted portion of said first message using said current key value.

21. The method of claim 11 wherein said step of generating a second message further comprises the steps of:

combining said first authentication value with said second authentication value;

generating a first portion of said second message by encrypting said combination using said current key value; and generating a second portion of said second message by encrypting said second authentication value using said current key value.

22. The method of claim 21 wherein said step of combining uses an exclusive-or operation.

23. The method of claim 21 wherein said step of extracting said first authentication value further comprises the steps of:

decrypting said first portion of said second message using said current key;

decrypting said second portion using said current key; and extracting said first authentication value from said decrypted first portion using said decrypted second portion of said second message.

24. The method of claim 21 wherein said step of determining a second authentication value further comprises the step of decrypting said second portion using said current key.

25. The method of claim 11 wherein said step of generating further comprises the steps of:

combining said second authentication value with a blinding factor; and encrypting said combination using said current key.

26. The method of claim 25 wherein said step of combining uses an exclusive-or operation.

27. The method of claim 11 wherein said step of extracting said second authentication value further comprises the steps of:

decrypting said third message using said current key value; and extracting said first authentication value from said decrypted third message using said blinding factor.

28. A system for bilaterally authenticating devices in a cryptographic system comprising:
- a first device for generating a current key and a first authentication value, for verifying a derived first authentication value and for deriving a second authentication value, said first device comprising:
  - a first central processing unit (CPU) for generating said first authentication value and deriving a second authentication value;
  - a first memory coupled to said first CPU for storing a plurality of future keys from which said current key is selected; and
  - a first input/output port coupled to said first CPU and said first memory;
- a second device coupled to said first device, said second device for generating said second authentication value, for verifying a derived second authentication value and for deriving a first authentication value, said second device comprising:
  - a second central processing unit (CPU) for generating said second authentication value;
  - a second memory coupled to said first CPU for storing an initial key for deriving said first authentication value; and
  - a second input/output port coupled to said first CPU and said first memory.

29. The system of claim 28 wherein said first and second CPUs implement key calculation algorithms.

30. The system of claim 28 wherein said first and second devices are smart cards.

31. An article of manufacture comprising:
- a computer usable medium having computer readable program code embodied therein for bilaterally authenticating devices in a cryptographic system comprising:
- computer readable program code configured to cause a computer to determine a current key and a first authentication value;
- computer readable program code configured to cause a computer to generate a first message, said first message containing said first authentication value encrypted using said current key;
- computer readable program code configured to cause a computer to transmit said first message to a second device;
- computer readable program code configured to cause a computer to receive a second message from said second device;
- computer readable program code configured to cause a computer to extract a first authentication value from said second message;
- computer readable program code configured to cause a computer to determine whether said extracted first authentication value is the same as said first authentication value;
- computer readable program code configured to cause a computer to validate said second device when said extracted first authentication value is the same as said first authentication value;
- computer readable program code configured to cause a computer to determine a second authentication value from said second message;
- computer readable program code configured to cause a computer to generate a third message for said second device, said third message containing said second authentication value.

32. The article of manufacture of claim 31 wherein said current key is dynamically generated, said computer readable code configured to cause a computer to determine a current key further comprises:
- computer readable code configured to cause a computer to generate a plurality of future keys; and
- computer readable code configured to cause a computer to select said current key from said plurality of future keys.

33. The article of manufacture of claim 32 further comprising computer readable code configured to cause a computer to remove said current key from said plurality of future keys.

34. The article of manufacture of claim 32 wherein computer readable code configured to cause a computer to generate further comprises:
- computer readable code configured to cause a computer to generate an initial key; and
- computer readable code configured to cause a computer to generate said plurality of future keys from said initial key.

35. The article of manufacture of claim 31 wherein said computer readable code configured to cause a computer to generate a first message further comprises:
- computer readable code configured to cause a computer to include in said first message a key identifier, said key identifier used to determine said first authentication value.

36. The article of manufacture of claim 31 wherein said computer readable code configured to cause a computer to generate said third message further comprises the steps of:
- computer readable code configured to cause a computer to combine said second authentication value with a blinding factor; and
- computer readable code configured to cause a computer to encrypt said combination using said current key.

37. An article of manufacture comprising:
- a computer usable medium having computer readable program code embodied therein for bilaterally authenticating devices in a cryptographic system comprising:
- computer readable program code configured to cause a computer to receive a first message from a first device;
- computer readable program code configured to cause a computer to determine a current key value using said first message, a key calculation algorithm and an initial key;
- computer readable program code configured to cause a computer to determine a first authentication value using said first message and said current key value;
- computer readable program code configured to cause a computer to generate a second message for said first device, said second message containing said first authentication value and a second authentication value;
- computer readable program code configured to cause a computer to transmit said second message to said first device;
- computer readable program code configured to cause a computer to receive a third message from said first device;
- computer readable program code configured to cause a computer to extract a second authentication value from said third message; and
- computer readable program code configured to cause a computer to determine whether said extracted second authentication value is the same as said second authentication value;

computer readable program code configured to cause a computer to validate said first device when said extracted second authentication value is the same as said second authentication value.

38. The article of manufacture of claim 37 wherein said computer readable program code configured to cause a computer to determine a first authentication value further comprises computer readable program code configured to cause a computer to decrypt an encrypted portion of said first message using said current key value.

39. The article of manufacture of claim 37 wherein said computer readable program code configured to cause a computer to generate a second message further comprises:

computer readable program code configured to cause a computer to combine said first authentication value with said second authentication value;

computer readable program code configured to cause a computer to generate a first portion of said second message by encrypting said combination using said current key value; and computer readable program code configured to cause a computer to generate a second portion of said second message by encrypting said second authentication value using said current key value.

40. The article of manufacture of claim 39 wherein said computer readable program code configured to cause a computer to extract said first authentication value further comprises the steps of:

computer readable program code configured to cause a computer to decrypt said first portion of said second message using said current key;

computer readable program code configured to cause a computer to decrypt said second portion using said current key; and computer readable program code configured to cause a computer to extract said first authentication value from said decrypted first portion using said decrypted second portion of said second message.

41. The article of manufacture of claim 37 wherein said computer readable code configured to cause a computer to extract said second authentication value further comprises:

computer readable code configured to cause a computer to decrypt said third message using said current key value; and computer readable code configured to cause a computer to extract said second authentication value from said decrypted third message using said blinding factor.

42. A method of reducing exposure of keys in the distribution of computing devices in a cryptographic system comprising the steps of:

storing a master key in a computing device resident in a secured environment;

generating using said master key a unique key for a plurality of distributable computing devices, said unique key being different for each of said plurality of distributable computing devices and different from said master key; and using said unique key in a transaction in said cryptographic system.

43. The method of claim 42 wherein said step of using further comprising the steps of:

generating using said unique key at least one future key; and deleting said unique key.

44. The method of claim 42 wherein said computing device resident in said secured environment and said plurality of computing devices are smart cards.

45. The method of claim 44 wherein said smart cards are used in an off-line payment authorization system, said computing device resident in said secured environment is a merchant's smart card and said plurality of computing devices are consumer smart cards.

46. The method of claim 42 wherein said master key and said unique key are used for authentication between said computing device resident in said secured environment and one of said plurality of computing devices.

47. The method of claim 46 wherein said authentication is bilateral authentication.

48. A method for asymmetric key management in a system of computing devices comprising the steps of:

for a first grouping of computer devices of said system:
generating a first master key that is stored in each device in said first grouping;
deriving a unique key for each device in said first grouping;

for a second grouping of computer devices of said system:
generating a second master key that is stored in each device in said second grouping, said second master key is used to derive said unique key for each device in said first grouping;
deriving a unique key for each device in said second grouping using said first master key.

49. The method of claim 48 further comprising:

for a third grouping of computer devices of said system:
generating a third master key that is stored in each device in said third grouping of computer;
deriving a unique key for each device in said third grouping using said first master key;
deriving a unique key for each device in said third grouping using said second master key;

for said first grouping of computer devices of said system:
deriving a unique key for each device in said first grouping using said third master key;

for said second grouping of computer devices of said system:
deriving a unique key for each device in said second grouping using said third master key.

50. The method of claim 48 further comprising the steps of:

performing a first authentication between a first device from said first device group and a second device from said second device group using said unique key of said first device and said second master key; and performing a second authentication between said first device and said second device using said unique key of said second device and said first master key.

51. The method of claim 48 wherein said unique key of said first and second devices are unique per device per transaction.

* * * * *